United States Patent
Yun et al.

(10) Patent No.: US 8,906,132 B2
(45) Date of Patent: Dec. 9, 2014

(54) SURFACE-MODIFIED BIOMASS, PREPARATION METHOD THEREOF, AND METHOD FOR RECOVERING VALUABLE METALS USING THE SAME

(75) Inventors: Yeoung-Sang Yun, Jeonju Jeonbuk (KR); Sung Wook Won, Jeonju Jeonbuk (KR); Sun Beom Choi, Jeonju Jeonbuk (KR); Sok Kim, Jeonju Jeonbuk (KR); Juan Mao, Jeonju Jeonbuk (KR); In-Seob Kwak, Jeonju Jeonbuk (KR); Jiyeong Park, Jeonju Jeonbuk (KR); Myung Hee Song, Jeonju Jeonbuk (KR); Min A Bae, Jeonju Jeonbuk (KR); Shi Yn Lee, Jeonju Jeonbuk (KR); Sneha Krishnamurthy, Jeonju Jeonbuk (KR); Thi Phuong Thuy Pham, Jeonju Jeonbuk (KR); Chul Woong Cho, Jeonju Jeonbuk (KR)

(73) Assignee: Industrial Cooperation Foundation Chonbuk National University, Jeonju, Jeonbuk (KR)

( * ) Notice: Subject to any disclaimer, the term of this patent is extended or adjusted under 35 U.S.C. 154(b) by 47 days.

(21) Appl. No.: 13/264,216

(22) PCT Filed: Jul. 27, 2009

(86) PCT No.: PCT/KR2009/004151
§ 371 (c)(1),
(2), (4) Date: Oct. 13, 2011

(87) PCT Pub. No.: WO2009/148292
PCT Pub. Date: Dec. 10, 2009

(65) Prior Publication Data
US 2012/0036962 A1    Feb. 16, 2012

(30) Foreign Application Priority Data

Apr. 14, 2009    (KR) .................. 10-2009-0032092

(51) Int. Cl.
*C22B 11/00*    (2006.01)
*C08G 73/10*    (2006.01)
(Continued)

(52) U.S. Cl.
CPC ............... *B01J 20/26* (2013.01); *B01J 20/328* (2013.01); *C22B 11/046* (2013.01);
(Continued)

(58) Field of Classification Search
CPC .. C22B 11/023; C22B 11/044; C22B 11/046; C22B 3/24; B01J 20/26; C02F 1/288; C02F 1/286
USPC ............................................. 75/631; 977/742
See application file for complete search history.

(56) References Cited

U.S. PATENT DOCUMENTS 4,212,943 A * 7/1980 Borglum ....................... 435/180
2003/0039605 A1 * 2/2003 Ramsay ....................... 423/460

FOREIGN PATENT DOCUMENTS

KR    10-2001-0097621 A    11/2001
KR    10-2007-0059171 A    6/2007

OTHER PUBLICATIONS

Schwartz, Harold. ProKon. "Gold (Au)". 1997-1998.*

(Continued)

*Primary Examiner* — George Wyszomierski
*Assistant Examiner* — Tina M McGuthry Banks
(74) *Attorney, Agent, or Firm* — McClure, Qualey & Rodack, LLP

(57) ABSTRACT

The present invention relates to a surface-modified biomass which is crosslinked with an amine group-containing cationic polymer on the surface of a cell biomass, its preparation method, and a method for recovering valuable metals using the same. The surface-modified biomass of the present invention has an advantage of improving adsorption of and affinity with anionic pollutants as a result of further introducing a cationic functional group by crosslinking of the amine group-containing cationic polymer on the surface of the biomass. In addition, the method for recovering valuable metals with the present invention is environment-friendly, economical, and harmless to the human body.

18 Claims, 5 Drawing Sheets

(51) Int. Cl.
    *B82Y 30/00*    (2011.01)
    *B01J 20/32*    (2006.01)
    *C22B 3/00*     (2006.01)
    *B01J 20/26*    (2006.01)
    *C02F 1/28*     (2006.01)
    *C22B 3/24*     (2006.01)
    *C02F 101/20*   (2006.01)
    *C02F 1/42*     (2006.01)

(52) U.S. Cl.
    CPC ............ *C02F 1/288* (2013.01); *C02F 2101/20* (2013.01); *C22B 3/24* (2013.01); *B01J 20/267* (2013.01); *C02F 2001/422* (2013.01); *B01J 20/265* (2013.01); *C02F 1/286* (2013.01); *C22B 11/042* (2013.01); *B01J 20/3242* (2013.01); *C22B 11/044* (2013.01); *Y10S 977/742* (2013.01)
    USPC ............................................ 75/631; 977/742

(56) References Cited

OTHER PUBLICATIONS

International Search Report dated Jan. 29, 2010 (English Translation).

Won, S.W., et al., "Utilization of Corynebacterium Glutamicum Biomass as a Regenerable Biosorbent for Removal of Reactive Dyes from Aqueous Solution," Korean Chem. Eng. Res., vol. 43, No. 4., pp. 542-547, Aug. 2005.

Han, M.H., et al., "Biosorption of Reactive Dyes Using Chemically Modified Sewage Sludge," Clean Technology, vol. 13, No. 3, pp. 215-221, Sep. 2007.

* cited by examiner

SURFACE-MODIFIED BIOMASS, PREPARATION METHOD THEREOF, AND METHOD FOR RECOVERING VALUABLE METALS USING THE SAME

CROSS REFERENCE TO RELATED APPLICATION

This application is the 35 U.S.C. §371 national stage of PCT application PCT/KR2009/004151, filed Jul. 27, 2009, which claims priority to and the benefit of Korean Patent Application No. 10-2009-0032092, filed on Apr. 14, 2009, both of which are hereby incorporated by reference in their entirety.

DETAILED DESCRIPTION

1. Technical Field

The present invention relates to a surface-modified biomass, a preparation method thereof, and biosorbents using the same, and more particularly, to a surface-modified biomass which is crosslinked with an amine group-containing cationic polymers on the surface of the bacterial biomass to improve adsorption of and affinity with anionic contaminants, a preparation method thereof, and a recovery method of precious metals using the same.

2. Background Art

Wastewaters containing heavy metals such as lead, mercury, cadmium, etc., and dyes are being produced in various industrial facilities such as dye houses, etc. When wastewater containing these heavy metals or dyes is released into the water system, serious contamination is caused, resulting in destruction of the aquatic ecosystem and adversely affecting human health as a result of biological concentration. Thus, effective treatment methods have been sought.

Chemical treatment, physicochemical treatment, and biological treatment are used as methods for removing contaminants such as dyes, heavy metals, etc., in industrial wastewater. Representative examples of chemical treatment are chlorine-based oxidation, Fenton's reagent method, an ozone method, etc. However, these chemical treatment methods are disadvantageous in that chemical sludge is produced, hazardous intermediates are generated, and operating costs are high. Although the activated sludge process, in which organic materials are generally adsorbed or decomposed by activated aerobic microorganisms, is the most commonly used as biological treatment, the process is disadvantageous since a large amount of sludge is produced and solid-liquid separation is very difficult in a sedimentation tank. In addition, most of the dyes in dye wastewaters consist of materials which are difficult to be biologically decomposed and, if decomposed, may produce toxic by-products, and thus the treatment efficiency is poor. Although precipitation, ion exchange, adsorption, electrophoresis, and film removal method are used as physical treatments of industrial wastewaters, these methods have problems such as production of large amounts of sludge, non-selectivity, excessive initial facility costs, high operating costs, etc. Thus, a biological method, which is environmentally-friendly and has high selectivity and efficiency for non-degradable materials such as dyes, heavy metals, etc., is needed. When these non-degradable materials are removed by using a biological method, these materials may be selectively removed, and higher economical efficiency would be expected if an appropriate immobilization method could be used, compared to conventional processes. Thus, research interests are increasingly focused on biosorption technology. The main advantages of this technique are the reusability of biomaterial, low operating cost, improved selectivity for specific metals of interest, removal of heavy metals from effluent, irrespective of toxicity, short operation time, and no production of secondary compounds which might be toxic. Therefore, there is need for development of a biomass which may treat non-degradable contaminants such as dyes, heavy metals, etc. effectively.

The refining process of recovering precious metals from mineral resources and secondary resources (scrap and waste materials generated during the manufacturing process, waste products disposed after use, etc.) includes enrichment, extraction, separation and purification, and recovery processes of precious metals. The separation and purification of precious metals is very closely associated with solution chemistry, and commonly used separation and purification methods are largely chemical precipitation and crystallization method, solvent extraction and ion exchange method, oxidation-distillation method, electrorefining method, etc. Among the methods, the separation and purification of precious metals is usually performed by using chemical precipitation method or solvent extraction method. However, recently as environmental regulations and regulations against human health hazards of working conditions have become stricter, the development of a new separation technology, which is more environmentally-friendly and may secure safe operations, is desperately needed.

DISCLOSURE

Technical Problem

A technical problem to be solved by the present invention is to provide a surface-modified biomass which is excellent in removing anionic contaminants and a biosorbent using the same.

A technical problem to be solved by the present invention is to provide a recovery method of precious metals, which is environmentally-friendly and harmless to the human health.

Technical Solution

An embodiment of the present invention relates to a surface-modified bacterial biomass including an amine group-containing cationic polymer which is crosslinked on the surface of the bacterial biomass.

In a surface-modified bacterial biomass according to an embodiment of the present invention, the amine group-containing cationic polymers may be crosslinked by an amine group or hydroxyl group onto the surface of the bacterial biomass.

An embodiment of the present invention relates to a recovery method of precious metals, by combining one or more surface-modified bacterial biomass, activated carbon, and carbon nanotubes into a precious metal-containing solution to adsorb the precious metals; incinerating an adsorbent on which the precious metals are adsorbed; heating the precious metals and ash produced in the incinerating to temperatures of melting points of the precious metals or more to separate the precious metals from the ash.

Advantageous Effects

Since the surface-modified biomass of the present invention is obtained by recycling fermented waste, it is environmentally-friendly and economical, and may be widely used as an inexpensive material for biosorption, which may substitute for conventional and expensive adsorbents.

The surface-modified bacterial biomass using Corynebacterium cells of the present invention is excellent in adsorption, economical, and reproducible, and may provide a biosorbent which may effectively remove and/or recover anionic solutes such as dye materials and precious metals from waste waters. In particular, the surface-modified biomass of the present invention shows excellent adsorption on anionic contaminants.

According to the recovery method of precious metals of the present invention, solid-phase concentrated precious metals may be recovered in a way which is environment-friendly, economical, and harmless to the human body by using a surface-modified biomass devoid of any addition chemicals like solvents, extracting agents, reducing agents, etc.

BEST MODE

Hereinafter, the present invention will be described in more detail.

An embodiment of the present invention relates to a surface-modified bacterial biomass including amine group-containing cationic polymers which are crosslinked on the surface of the bacterial biomass.

As used herein, the term "biomass" refers to a living or deceased biological material which may be used in industrial production, and in particular, a bacterial biomass of the present invention refers to a biomass consisting of deceased bacterial cells, such as *Escherichia coli* or *Corynebacterium*.

Bacteria such as *E. coli* or *Corynebacterium* are widely used as strains which produce materials such as antibiotics, anticancer drugs, amino acids, nucleic acids, etc., and disposed as solid fermentation waste after the bacteria are used and terminated.

Figure 1:
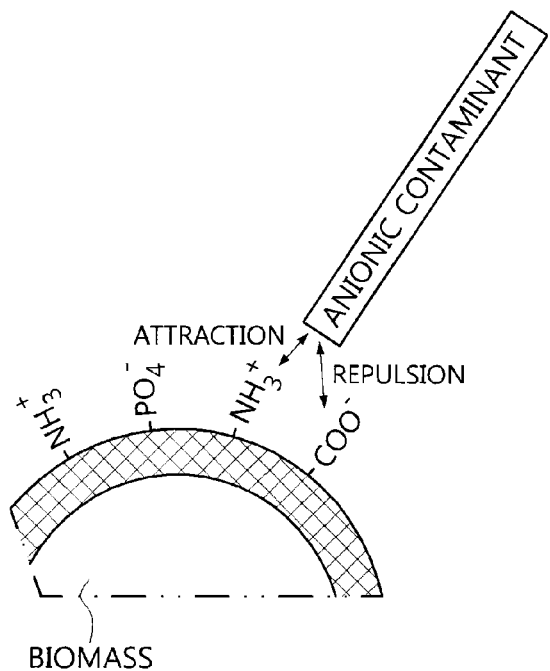
FIG. 1 is a schematic view illustrating the structure of a main functional group when a bacterial biomass is present in an aqueous solution.

FIG. 1 is a schematic view illustrating the structure of main functional groups when a bacterial biomass is present as a solid waste in an aqueous solution. Referring to FIG. 1, anionic functional groups (carboxyl group or phosphate group) and a cationic functional groups (amine group) are abundantly present in the bacterial biomass.

In the present invention, in order to adsorb a precious metal showing anionic properties in a solution, a cationic polymer including a large amount of an amine group as a cationic functional group may be additionally introduced into the surface of a bacterial biomass, such that the content of the cationic functional group may be increased or a functional group in which an anionic functional group is blocked or removed may be used.

The bacterial biomass may include an amine-group containing cationic polymer which is crosslinked on the surface of the bacterial biomass.

As used herein, the term "amine-group containing cationic polymer" refers to a polymer which includes an amine group in a main chain or a side chain thereof and is positively charged as a whole. The amine-group containing cationic polymer of the present invention may be prepared by polymerizing one or more cationic monomers or polymerizing one or more non-ionic monomers with one or more cationic monomers.

Methods for crosslinking an amine group-containing cationic polymer to the bacterial biomass are not particularly limited, but the amine group-containing cationic polymer is preferably crosslinked by an amine group or a hydroxyl group on the surface of the bacterial biomass.

In the present invention, the bacterial biomass may consist of one or more bacterial cells selected from the group consisting of *Corynebacterium* sp., *Escherichia* sp., *Bacillus* sp., and *Serratia* sp.

Non-limiting examples of bacteria constituting the bacterial biomass may include bacteria, such as *Corynebacterium ammoniagenes, Corynebacterium glutamicum, Escherichia coli, Bacillus megatherium, Serratia marcescens, Brevibacterium ammoniagenes,* etc.

Besides the above-mentioned bacteria, the examples may include *Corynebacterium betae, Corynebacterium beticola, Corynebacterium bovis, Corynebacterium callunae, Corynebacterium cystitidis, Corynebacterium diphtheriae, Corynebacterium equi, Corynebacterium fascians, Corynebacterium flaccumfaci, Corynebacterium flavescens, Corynebacterium hoagii, Corynebacterium ilicis, Corynebacterium insidiosum, Corynebacterium kutscheri, Corynebacterium lilium,* etc.

Examples of the amine group-containing cationic polymer which is available in the present invention may be selected from the group consisting of polyethyleneimine, amine-terminated polyethylene oxide, amine-terminated polyethylene/polypropylene oxide, polymers of dimethyl amino ethyl methacrylate and copolymers of dimethyl amino ethyl methacrylate and vinyl pyrrolidone, linear polymers of epichlorohydrin and dimethyl amine, polydiallyldimethylammonium chloride, polyethanolamine/methyl chloride, and modified polyethyleneimine. Among polymers having primary, secondary, and tertiary amines, a polymer having a primary amine is preferably selected.

The amine group-containing cationic polymer may be a polyethyleneimine homopolymer of the following Formula 1, or modified polyethyleneimine.

[Formula 1]

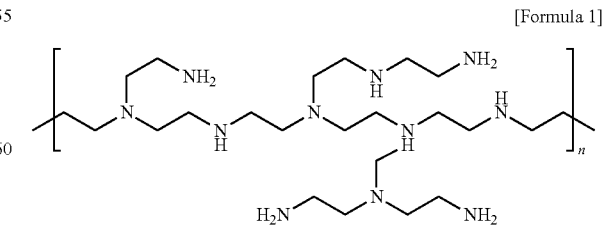

where n is 10 to 500.

The amine group-containing cationic polymer may have 70% or more by mole of cationic charges, and the molecular weight of the amine group-containing cationic polymer is not particularly limited, but may be, for example, in a range of 1,000 to 200,000.

The amine group-containing cationic polymer may be a polyethyleneimine homopolymer, and the biomass may be a biomass of *Corynebacterium glutamicum*.

An anionic functional group may be additionally blocked on the surface of a surface-modified bacterial biomass according to an embodiment of the present invention in order to increase the adsorption capability of anionic contaminants.

When a surface-modified bacterial biomass is prepared by using a method of the present invention, a dried bacterial biomass may be added to an amine group-containing cationic polymer solution for reaction. Subsequently, a cross-linking agent may be added to the mixture of the bacterial biomass and the amine group-containing cationic polymer solution for reaction, and finally the biomass may be washed and dried to prepare a surface-modified bacterial biomass.

The amine group-containing cationic polymer used in the present invention may have 70% or more by mole of cationic charges, and the molecular weight of the polymer may be in a range of 1,000 to 200,000.

The method of the present invention may additionally include blocking an anionic functional group on the surface of the surface-modified bacterial biomass to minimize a functional group having repulsion against anionic contaminants. An anionic functional group on the surface of the surface-modified bacterial biomass may be substituted and blocked by a compound having a cationic functional group such as an amine group or an amino group, etc.

The amine group-containing cationic polymer solution may include one or more selected from the group consisting of water, alcohol, chloroform, and pyridine as a solvent. In the step, the biomass may be dispersed in a sufficient amount of an amine group-containing cationic polymer, and the mixing ratio of the biomass to the amine group-containing cationic polymer is, for example, 1:0.5 to 2 (w:w), and preferably 1:1 to 2 (w:w).

The temperature for reacting the bacterial biomass with the amine group-containing cationic polymer is not particularly limited, but reaction may be performed, for example, at about 20 to about 150° C. so as to increase the reaction efficiency.

If the amine group-containing cationic polymer is crosslinked on the surface of the bacterial biomass, a treatment with a cross-linking agent is performed so as to strengthen the chemical bond between the bacterial biomass and the amine group-containing cationic polymer. In this case, the cross-linking agent may be one or more selected from the group consisting of glutaraldehyde, isocyanide derivatives, and bisdiazobenzidine.

Figure 2:
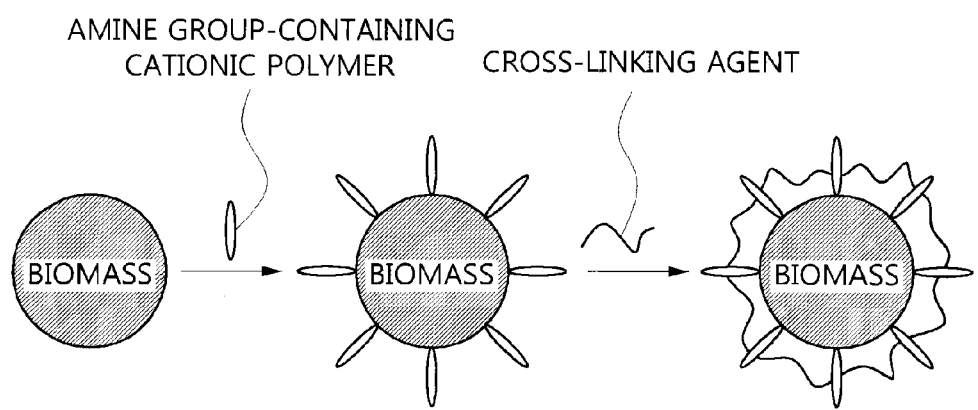
FIG. 2 is a schematic view to describe a preparation method of a surface-modified bacterial biomass according to an embodiment of the present invention.

As shown in FIG. 2, the cross-linking agent may be mixed in the form of a solution at a volume ratio of about 1:1 to 10:1 with a mixture of the biomass and the amine group-containing cationic polymer, and preferably at a volume ratio of about 5:1.

As a solvent, one or more selected from the group consisting of water, methanol, chloroform, pyridine, and alcohols such as ethanol and butanol may be used.

After the treatment with the cross-linking agent, the biomass is washed and dried. The washing and drying method is not particularly limited. For example, the biomass may be lyophilized or dried in an oven at high temperatures for a predetermined time. The drying temperature and drying time may be arbitrarily controlled according to the water content of the biomass, etc.

A surface-modified bacterial biomass available in the present invention may be a biomass in which an anionic functional group may be blocked or removed on the surface of the biomass in order to increase the adsorption capability of anionic complexes.

As shown in FIG. 1, an anionic functional group, such as a carboxyl group and a phosphate group, which is present on the surface of the bacterial biomass, is present in a negatively charged state in water, and thus exerts repulsion against an anionic precious metal complex. The repulsion serves to interfere with the biomass to prevent binding to an anionic complex.

The bacterial biomass may employ a surface-modified biomass in which an anionic functional group, such as a carboxyl group, a phosphate group, and a sulfonate group, which acts as an interfering group, is substituted by a compound having a cationic functional group, such as an amine group or an amino group.

The bacterial biomass may employ a surface-modified biomass in which a carboxyl group, a phosphate group, and a sulfonate group on the surface of the biomass is alkylated, cycloalkylated, or arylated.

The surface-modified biomass may be represented by the following Formula 2 as an example, and the Formula 2 has a structure in which hydrogen of the carboxyl group or the phosphate group of the bacterial biomass is substituted by an alkyl group, a cycloalkyl group, an aryl group, or an amine group.

Biomass-COOR [Formula 2]

where R is an alkyl group having a carbon number of 1 to 10, a cycloalkyl group having a carbon number of 3 to 10, or an aryl group having a carbon number of 6 to 15, or $NR_1R_2$. R1 and R2 each are hydrogen, an alkyl group having a carbon number of 1 to 10, a cycloalkyl group having a carbon number of 3 to 10, or an aryl group having a carbon number of 6 to 15.

When the carbon number is large high in the Formula, it may be difficult to achieve the commercialization, and thus alkylation with an alkyl group having a carbon number of 1 to 6 is more preferable, and methylation is the most preferable.

A method for achieving alkylation, cycloakylation, and arylation with an amino group of the biomass may include adding the biomass to a mixed solution of aldehyde and carboxylic acid for reaction.

Although there is no limitation on the mixing ratio of the aldehyde, carboxylic acid, and biomass, 1 to 40 ml of aldehyde and 1 to 160 ml of carboxylic acid are preferably mixed based on 1 g of the biomass.

In the mixing ratio, a volume ratio of aldehyde to carboxylic acid is more preferably 1 to 1/4.

The mixing ratio of aldehyde:carboxylic acid:biomass is the most preferably 20 ml:40 ml:1 g.

Preferably, the aldehyde is formaldehyde and the carboxylic acid is formic acid in terms of reducibility, and an alkylation method of an amino group of the biomass by using these may be represented by the following Reaction Formula 1.

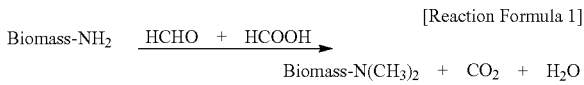

[Reaction Formula 1]

The above reaction is preferably performed at 10 to 100° C. for 1 to 48 hours. The above reaction may be performed at 10 to 1000 rpm in a mixed reactor.

When a precious metal complex is cationic, a surface-modified biomass which has increased anionic properties may be used. A bacterial biomass which has increased anionic properties may be prepared by additionally binding a compound which includes one or more of a carboxyl group, a sulfonate group, and a phosphate group to the raw biomass.

The compound having a carboxyl group additionally bound to the raw biomass may be represented by the following Formula 3.

$$R_1-CH_2-COOCH_2-\text{Biomass} \quad \text{[Formula 3]}$$

where $R_1$ is a carboxyl group, a linear or branched alkyl group having a carbon number of 1 to 10, which includes one or more carboxyl groups, an alkenyl group or an alkoxy group, and may be represented by the following Formula 4.

$$\begin{array}{c} R_2 \\ | \\ -C-COOH \\ | \\ R_3 \end{array} \quad \text{[Formula 4]}$$

where $R_2$ and $R_3$ each are H, —OH, —COOH, and —$CH_2$—COOOH.

A compound having the carboxyl group may be represented by the following Formula 5. The following Formula 5 has a structure in which an amine group or an amino group of the raw biomass is substituted by a compound having a carboxyl group.

$$\text{Biomass-}NHR_4COOR_5 \quad \text{[Formula 5]}$$

where $R_4$ is a linear or branched alkylene group having a carbon number of 1 to 10 or a linear or branched alkenylene group having a carbon number of 2 to 10, and $R_5$ is H, Na, or K.

A structure in which an amine group or an amino group of the biomass is alkylated, cycloalkylated or arylated may be represented by the following Formula 6. When an amino group is substituted by an alkyl group, a cycloalkyl group, and an aryl group, the case is referred to as alkylation, cycloalkyation, and arylation, respectively.

$$\text{Biomass-N(R)}_2 \quad \text{[Formula 6]}$$

where R is an alkyl group having a carbon number of 1 to 10, a cycloalkyl group having a carbon number of 3 to 10, or an aryl group having a carbon number of 6 to 15.

Hereinafter, a method for recovering precious metals by using the surface-modified biomass will be described in detail.

Step of Adsorbing Precious Metals

This step is for adsorbing precious metal in a precious metal-containing solution by using the surface-modified bacterial biomass previously mentioned. The surface-modified bacterial biomass may be used as an adsorbent.

The precious metal-containing solution may include waste materials containing non-ferrous metals, such as a waste catalyst, waste scrap, a waste dry battery, an industrial waste liquid, converter dust, a waste can, etc.

The industrial waste liquid containing precious metals is usually generated in an industry using precious metals as catalysts in chemical processes and electric and electronics industry. In particular, waste water is produced in a state where ruthenium (Ru) and iridium (Ir) are included in the acetic acid waste liquid from in chemical plants, and various precious metals (in particular, platinum, rhodium, etc.) are included in an ICP-analyzed waste water.

The precious metal may be one or more selected from the group consisting of gold, silver, palladium, platinum, iridium, osmium, rhodium, and ruthenium.

Preferably, a dissolving agent is used to dissolve the precious metal and prepare an aqueous solution such that the precious metal may form various ligands and coordination complexes.

As the dissolving agent, known dissolving agents may be appropriately selected according to the kind of the precious metal. The dissolving agent may include one or more of hydrochloric acid, nitric acid, aqua regia, sulfuric acid, cyanide (CN), and halogen elements. The halogen elements include fluorine (F), chlorine (Cl), bromine (Br), iodine (I), astatine (At), etc., and preferably, may include one or more of iodine (I) and bromine (Br).

For example, platinum group metals which are not readily soluble in acids are dissolved by hydrochloric acid in the presence of an oxidant. Examples of the oxidant are nitric acid, gaseous chlorine, hypochlorite (HOCl), sodium hypochlorite (NaOCl), sodium chlorate (NaClO$_3$), hydrogen peroxide (H$_2$O$_2$), etc., (Bradford, 1975). Platinum, palladium, and rhodium are respectively dissolved in PtCl$_6^{-2}$, PdCl$_4^{-2}$, and RhCl$_6^{-3}$ by hydrochloric acid in the presence of a chlorine-based oxidant.

As the dissolving agent, sulfuric acid may be used, and more specifically, 60% H$_2$SO$_4$ solution+0.1 M solution may be used to dissolve platinum group metals.

Iodine/iodide may be used as the dissolving agent, and preferably, may be used to dissolve palladium.

The dissolution may employ a cyanide process using cyanide (CN).

The structure of a complex dissolved and formed by the dissolving agent may include palladium (PdCl$_4^{2-}$, PdCl$_3^-$), gold (Au(CN)$_2^-$), platinum (PtCl$_4^{2-}$, PtCl$_6^{4-}$), etc.

The precious metal complex is charged, and preferably negatively charged. The adsorption of the bacterial biomass, in which the content of the cationic functional group is increased or the anionic functional group is blocked, as described above, to the anionic precious metal complex may be achieved by static electric attraction.

An adsorption material used in the recovery method of precious metals of the present invention may employ activated carbon and carbon nanotubes.

Activated carbon is a carbon product which activates an internal surface thereof through vapor and chemical activation processes by using palm shell, wood, olive fruit skin, and carbon-based materials which are porous, and peat, and known activated carbon may be used.

The average pore diameter of the activated carbon is not particularly limited, but may be more than 15 to 30 Å, and preferably 20 to 30 Å.

Incineration Step

This step is for incinerating an adsorption material on which the precious metals are adsorbed.

The incineration step may include separating the precious metal-containing adsorbent from a solution and then drying the material at 20 to 100° C. During drying, all the residual water in the adsorption material may be removed.

Subsequently, the precious metal-containing adsorption material may be burnt at 300° C. or more and less than the melting point of the precious metal in the incineration step. The incineration may be performed preferably at 600 to 1000° C., and most preferably at 800 to 1000° C. The recovery rate and purity of the metal is the highest when the temperature is around about 900° C.

The recovery rate of the precious metal may be controlled according to incineration conditions under which the precious metal adsorbed on activated carbon is incinerated and recovered (in particular, temperature and oxygen concentration).

Although the bacterial biomass as an adsorption material may be generally ignited at 600° C. and burnt, the precious metal is not melted or burnt at the temperature.

When the incineration is complete, the device is cooled and ash containing metals is collected.

Separation Step

This step is for melting the precious metal to separate the metal from the ash.

The step may include heating the precious metal contained in the ash to the melting point or more of the precious metal to melt the metal, and separating the precious metal in the liquid phase from the ash.

Since the melting point of gold which is one of the precious metals, is 1064° C. and the melting point of platinum is 1768.3° C., the precious metal may be melted if the metal is heated to a point of the temperature or more. Preferably, the heating temperature may be the melting point to 3100° C.

In another embodiment, the present invention involves a recovery method of a precious metal, including inputting the surface-modified bacterial biomass to a precious metal-containing solution to adsorb a precious metal; and adding the bacterial biomass to a strong acid solution to desorb the adsorbed precious metal from the bacterial biomass.

The present invention is a method for recovering precious metals adsorbed on the bacterial biomass by desorption.

The desorption step may be a step of adding the bacterial biomass to a mixed solution of thiourea and strong acid for desorption. If a mixture of acid and thiourea is used as a mixed solution used in the desorption, the desorption efficiency is greatly increased.

Preferably, an aqueous solution of hydrochloric acid, sulfuric acid, or nitric acid as the strong acid is used. The strong acid aqueous solution may be in a range of 0.01 to 10 M, and preferably 0.1 to 3 M, and thiourea may be used in a range of 0.005 to 5 M, and preferably 0.1 to 1 M.

Hereinafter, the present invention will be described in more detail with reference to Examples. However, these Examples are intended to illustrate preferred embodiments of the present invention and do not limit the scope of the present invention.

Examples 1 to 10

2 g of *Corynebacterium glutamicum* biomass as a fermentation waste, which was dried without any pretreatment was put into 500 ml of distilled water containing PEI at various concentrations as described in the following Table 1 and stirred at room temperature for 2 hours. Subsequently, as shown in the following Table 1, 500 mL of a glutaraldehyde (GA) solution was added to each of the mixed solutions including the biomass at different concentrations and stirred by varying the reaction time as shown in the following Table 1. Then, the ratio of each component is described as in the following table. After the completion of the reaction, the mixture was washed with de-ionized water and lyophilized to obtain a PEI-surface modified biomass, the amount of adsorption was evaluated by the following method, and the result was shown in the following Table 1 and FIG. 3.

Isothermal Adsorption Experiment

In order to confirm the dye adsorption of the biomass, an isothermal adsorption experiment was performed at pH=2. This experiment was an experiment in which temperature and pH were constantly maintained and the adsorption amount of a dye was measured at various dye concentrations. The experiment was performed by adding each of 0.4 g of the biomass in Examples 1 to 10 and Comparative Example 1 and 40 mL of an RR4 dye aqueous solution obtained by varying the initial concentration of the dye from 50 mg/L to 2000 mg/L to a plurality of 50 mL tubes and then maintaining the pH of each tube at a constant value. Each tube was stirred at 160 rpm at room temperature of about 25° C. for 24 hours. During the adsorption experiment, the pH of the solution was constantly adjusted to 6 by using a 1 N HNO₃ aqueous solution while the pH was being observed. After the adsorption reached the equilibrium, the residual concentration of the dye was analyzed. In order to calculate the maximum adsorption and binding affinity, the experimental data were regressed by using the Langmuir model in the following Mathematical Formula 1 and a Sips model in the following Mathematical Formula 2.

$$Q = \frac{Q_{max} b_L C_f}{1 + b_L C_f}$$ [Mathematical Formula 1]

where $Q_{max}$ is the maximum dye adsorption amount (mg/g), $b_L$ is the Langmuir equilibrium constant (1/mg), and $C_f$ is the final concentration of the dye.

$$Q = \frac{K_S C_f^{\beta s}}{1 + a_S C_f^{\beta s}}$$ [Mathematical Formula 2]

where $K_s$ is the Sips model isotherm constant $((1/g)^{\beta}s)$, $a_s$ is the Sips model constant, $\beta s$ is the Sips model exponent $((1/mg)^{\beta}s)$, and $C_f$ is the final concentration of the dye.

Comparative Example 1

The *Corynebacterium glutamicum* biomass as a fermentation waste was washed, followed by evaluation of the adsorption amount without any treatment by using an adsorbent in the same manner as in the Examples, and then the result was shown in the following Table 1 and FIG. 3.

TABLE 1

| Sample | Comparative Example 1 | Example | | | | | | | | |
|---|---|---|---|---|---|---|---|---|---|---|
| | | | 2 | 3 | 4 | 5 | 6 | 7 | 8 | 9 | 10 |
| Reaction time (min) | | 10 | 10 | 10 | 10 | 60 | 10 | 60 | 60 | 60 |
| PEI % (w/v) | | 5 | 15 | 5 | 15 | 1 | 0.1 | 0.1 | 0.5 | 1 |
| GA % (v/v) | | 0.5 | 0.5 | 1.5 | 1.5 | 1 | 0.05 | 0.05 | 0.1 | 0.2 |
| PEI:GA | | 10:1 | 30:1 | 3.3:1 | 10:1 | 1:1 | 2:1 | 2:1 | 5:1 | 5:1 |
| Adsorption amount (mg/g) | 111.71 | 228.4 | 276.3 | 178.1 | 322.5 | 268.2 | 159.8 | 176.3 | 613.0 | 597.4 |
| Increase fold level (fold) | 1.00 | 2.04 | 2.47 | 1.59 | 2.89 | 2.40 | 1.43 | 1.58 | 5.49 | 5.35 |

Figure 3:
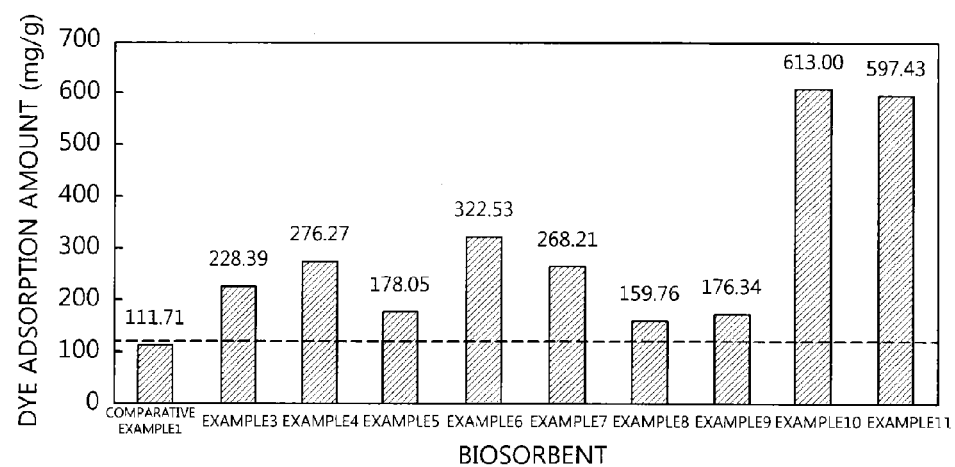
FIG. 3 is a graph illustrating a comparison of results of dyes adsorbed by using biomasses in Examples 1 to 10 and Comparative Example 1.

As confirmed from the results of Table 1 and FIG. 3, the PEI surface-modified biomass showed a significant difference in adsorption according to PEI, GA, and reaction time, and when the ratio of PEI (w/v) to GA (v/v) was 5:1 and the reaction time was 60 min, the maximum adsorption amount of RR4 (reactive dye) was 613 mg/g, which was the best result. This is a result that the adsorption was enhanced by about 5.5 times, compared to the raw biomass.

Example 11

10 g of *Corynebacterium glutamicum* biomass (Daesang Co. Gunsan Plant, Gunsan, Jeonbuk, Korea) as a fermentation waste, which was obtained in the form of a dried powder from a fermentation process, was added to a mixed solution of 2.5 ml of pyridine and 95 ml of chloroform and stirred at room temperature. Subsequently, 5 ml of 4-bromobutyryl chloride was added dropwise to the mixed solution and the mixture was allowed to be reacted in a sealed state under stirring at 25° C. for 12 hours to acylate the biomass. The acylated biomass was washed with chloroform to remove unreacted 4-bromobutyryl chloride.

Subsequently, the biomass obtained in the previous step was added to 90 ml of a tert-amyl alcohol solution to which 10 g of polyethyleneimide (weight-average molecular weight 25000 g/l) and 0.1 g of KOH were added and the mixture was stirred at 75° C. for about 24 hours. After the reaction was completed, the biomass was washed several times with methanol and de-ionized water and then lyophilized to obtain a biomass which was surface-modified with polyethyleneimide.

In order to recover platinum and rhodium from an ICP-analyzed waste water which usually contained platinum and rhodium, 5 g/L of the surface-modified biomass obtained above was added thereto and the mixture was stirred with a pH level of 0.58 for 2 hours to adsorb gold. Subsequently, the biomass on which platinum and rhodium were adsorbed was heated to 20 to 100° C. in a drier to remove moisture. The biomass was heated to about 600° C. in a combustion furnace. Ash produced by combustion, platinum, and rhodium were collected and heated to about 1850° C. in a dry furnace device to melt platinum and separate the metal from the ash, and heated to about 2000° C. to melt rhodium and separate the metal from the ash.

Example 12

A *Corynebacterium glutamicum* biomass (Daesang Co. Gunsan Plant, Gunsan, Jeonbuk, Korea) as a fermentation waste, which was obtained in the form of a dried powder from a fermentation process, was subjected to acid treatment with a 1 N $HNO_3$ solution at room temperature for 24 hours. The acid-treated biomass was washed three times with distilled water and dried at 60° C. for 24 hours. 3 g of the dried biomass was dispersed in 300 mL of anhydrous methanol, and $HNO_3$ as an acid catalyst was added thereto to make the final concentration 1 M. Next, the mixture was stirred at 160 rpm at room temperature for 6 hours by using a rotating stirrer for reaction and then a biomass, in which a carboxyl group was removed, was obtained.

Hydrochloric acid as a dissolving agent was added to a gold mixture ($KAu(CN)_2$) to dissolve gold, 5 g/L of the surface-modified biomass obtained above was added thereto, and the mixture was stirred at pH=2.5 for 2 hours to adsorb gold. Subsequently, the biomass on which gold was adsorbed was heated to 20 to 100° C. in a drier to remove moisture. The biomass was heated to about 600° C. in a combustion furnace. Ash produced by combustion and gold were collected and heated to about 1200° C. in a dry furnace device to melt gold and separate the metal from the ash.

Comparative Example 2

A *Corynebacterium glutamicum* biomass as a fermentation waste was washed and then an experiment was performed without any treatment in the same manner as in Example 12.

The following Table 2 shows the adsorption amounts and purities of precious metals in Examples 11 and 12.

TABLE 2

|  | Precious metal | [a]Adsorption amount (mg/g) | [b]Purity (%) |
|---|---|---|---|
| Example 11 | Platinum | 69.3 | 58.7 |
|  |  | 63.0 | 59.9 |
| Example 12 | Gold | 63.5 | 58.9 |
|  |  | 71.7 | 61.9 |

[a]Adsorption amount refers to an amount of a precious metal adsorbed by an adsorption material, and the data were obtained in a state prior to incineration.
[b]This is represented by percentage (%) of a precious metal included in the ash after the adsorption material containing the precious metal was incinerated.

Here adsorption amount and purity of metal were calculated by using the following two equations:

$$\text{Adsorption amount (mg/g)} = \frac{(\text{initial metal concentration} - \text{final metal concentration})(\text{mg/l}) \times \text{volume(l)}}{\text{amount of absorbent (g)}}$$

$$\text{Purity (\%)} = \frac{\text{Weight of precious metal in the ash (g)}}{\text{Weight of the ash (g)}}$$

Referring to Table 2, it is confirmed that precious metal such as gold, platinum, etc., may be obtained in a way which is harmless to the human body by using a bacterial biomass even though it is subjected to simple processes, such as adsorption/incineration/separation, compared to conventional chemical precipitation methods or solvent extraction methods.

Figure 4:
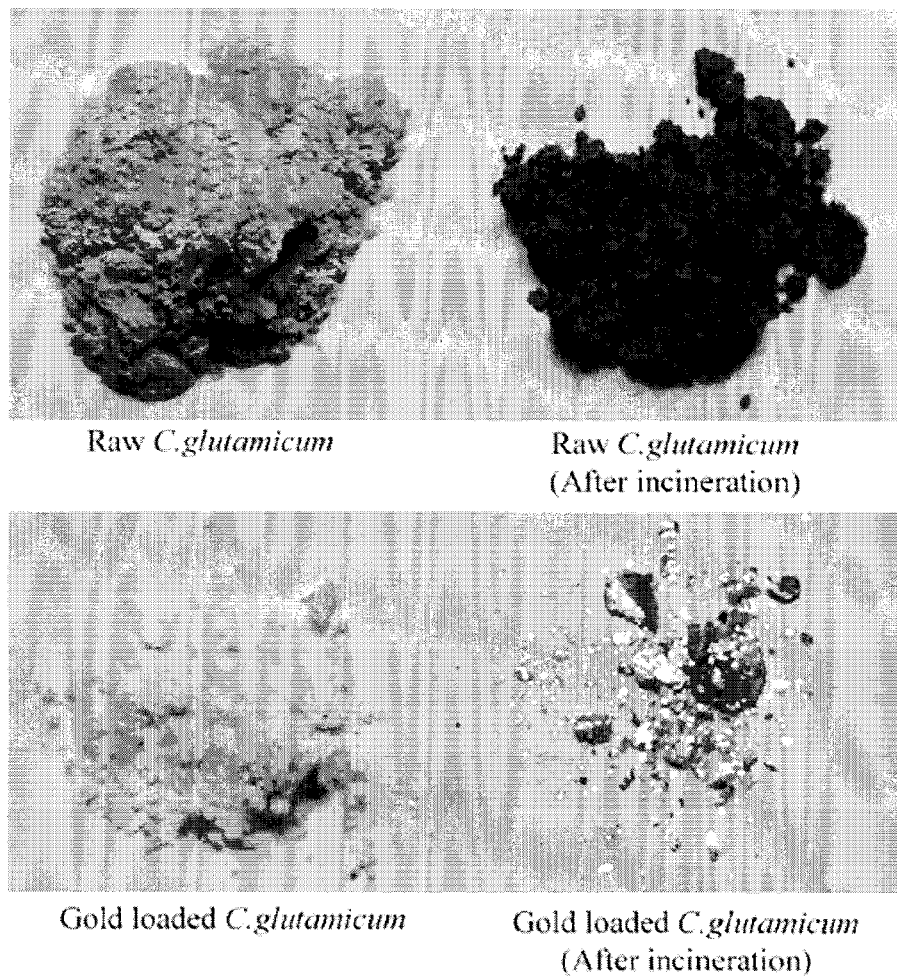
FIG. 4 shows a raw biomass on which gold was not adsorbed and a product obtained by incinerating the biomass (top), and the photo below shows a raw biomass on which gold was adsorbed and a biosorbent including gold, obtained by incinerating the biomass.

The top photo in FIG. 4 shows a raw biomass on which gold was not adsorbed and a product obtained by incinerating the biomass, and the bottom photo shows a raw biomass on which gold was adsorbed and an adsorption material including gold, obtained by incinerating the biomass (in Example 12). Referring to the bottom photo in FIG. 4, it is confirmed that a substantial amount of gold was adsorbed on the biomass in Example 12.

Figure 5:
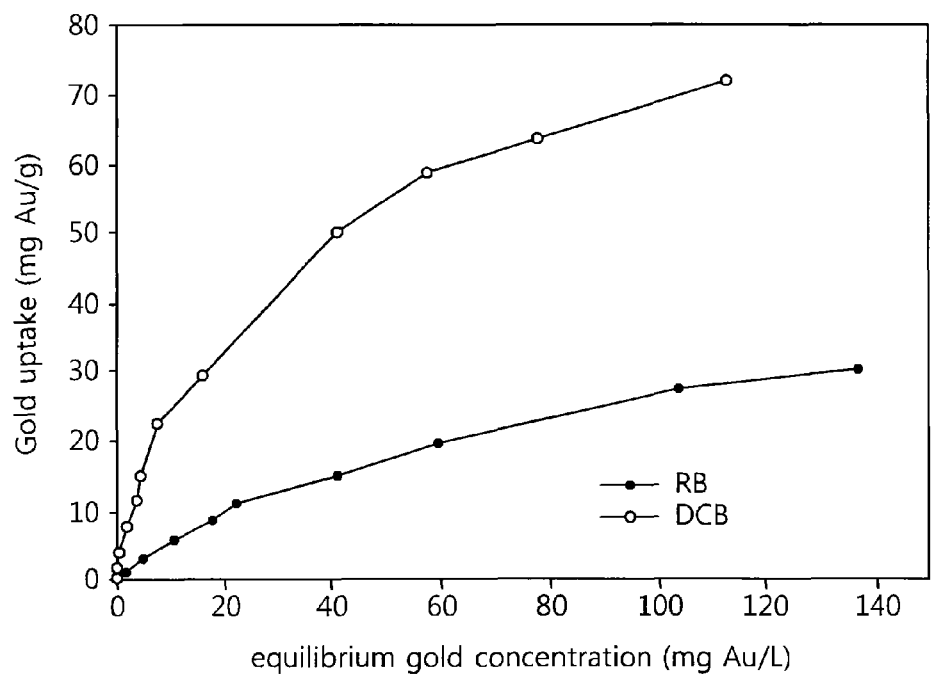
FIG. 5 is a graph illustrating the maximum amount of the biomass adsorbed on gold in Example 11 and Comparative Example 2.

FIG. 5 is a graph illustrating the maximum adsorption amounts of the biomass to gold in Example 12 and Comparative Example 2. Referring to FIG. 5, the maximum adsorption amount of the biomass in Comparative Example 2 was only about 30 mg/g, while the amount in Example 12 was 72 mg/g, indicating a 2.4 fold increase in adsorption.

Example 13 and Comparative Example 3

0.03 g of the polyethyleneimide surface-treated biomass (PEIB) obtained in Example 11 was added to 30 mL of a palladium (Pd) solution (100 mg/L) and the mixture was stirred at room temperature overnight. Subsequently, the PEIB, on which palladium was adsorbed, was added to a solution in which thiourea in a range of 0 to 2 M was mixed with 0.1 M of an HCl solution, and the mixture was stirred at room temperature overnight.

Figure 6:
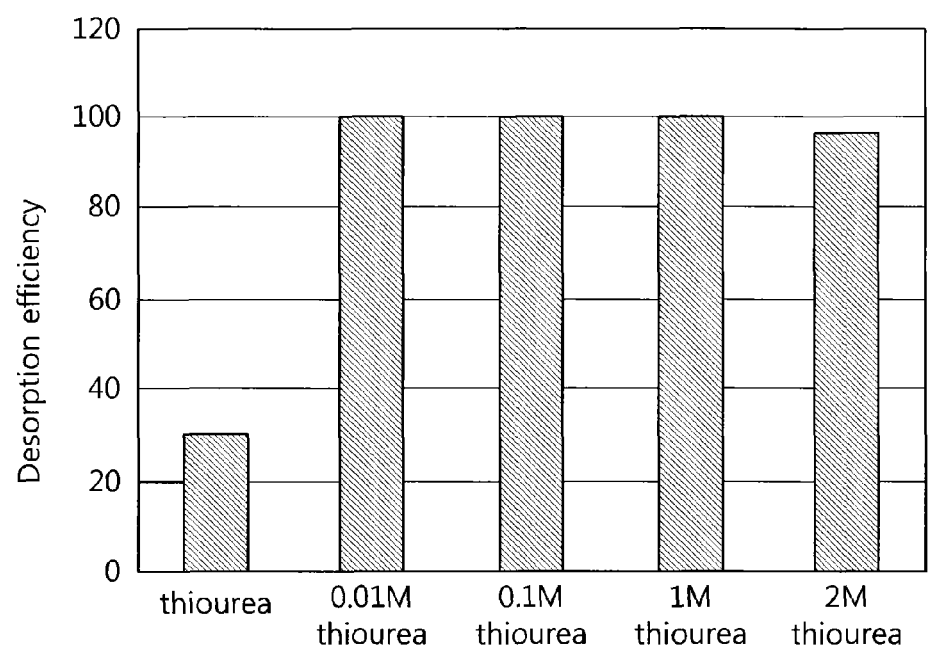
FIG. 6 is a graph illustrating the desorption rate of palladium according to the content of thiourea added to 0.1 M of an HCl solution.

FIG. 6 is a graph illustrating the desorption rate of palladium according to the content of thiourea added to 0.1 M of the HCl solution. Referring to FIG. 6, it is determined that only a sample which did not include thiourea showed a 30% desorption, while other samples which included thiourea showed almost a 100% desorption rate. Here, the desorption rate is a value obtained by converting 86.5 mg/g which is an amount of palladium adsorbed on the PEIB into 100.

Although the present invention has been described in detail with reference to preferred embodiments thereof, the description only describes and discloses exemplary examples of the present invention. It will be appreciated by those skilled in the art that various changes, alterations, and modifications may be made from the description and accompanying drawings without departing from the scope and spirit of the present invention.

What is claimed is:

1. A recovery method of precious metals, comprising:
    inputting one or more adsorption materials of a surface-modified bacterial biomass into a precious metal-containing solution to adsorb the precious metal;
    incinerating an adsorption material on which the precious metal is adsorbed such that ash is produced; and
    heating the precious metal and ash produced in the incinerating to temperatures of a melting point of the precious metal or more to separate the precious metal from the ash;
    wherein the bacterial biomass is a surface-modified bacterial biomass comprising an amine group-containing cationic polymer which is crosslinked on the surface of the bacterial biomass by an amine group or a hydroxyl group.

2. The method of claim 1, wherein the bacteria is one selected from the group consisting of *Corynebacterium ammoniagenes*, *Corynebacterium glutamicum*, *Escherichia coli*, *Bacillus megatherium*, *Serratia marcescens*, and *Brevibacterium ammoniagenes*.

3. The method of claim 1, wherein the amine group-containing cationic polymer is selected from the group consisting of polyethyleneimine, amine-terminated polyethylene oxide, amine-terminated polyethylene/polypropylene oxide, polymers of dimethyl amino ethyl methacrylate and copolymers of dimethyl amino ethyl methacrylate and vinyl pyrrolidone, linear polymers of epichlorohydrin and dimethyl amine, polydiallyldimethylammonium chloride, polyethanolamine/methyl chloride, and modified polyethyleneimine.

4. The method of claim 1, wherein the amine group-containing cationic polymer is a polyethyleneimine homopolymer and the biomass is a biomass of *Corynebacterium glutamicum*.

5. The method of claim 1, wherein the amine group-containing cationic polymer has 70% or more, by mole of cationic charges.

6. The method of claim 1, wherein an anionic functional group is blocked on the surface of the surface-modified bacterial biomass.

7. The method of claim 1, wherein an anionic functional group on the surface of the surface-modified biomass is substituted by a compound having an amine group or an amino group and blocked.

8. The method of claim 1, wherein the surface-modified bacterial biomass is prepared:
    adding a dried bacterial biomass to an amine group-containing cationic polymer solution for reaction;
    adding a cross-linking agent to the bacterial biomass and the amine group-containing cationic polymer solution for reaction; and
    washing the biomass and drying the biomass.

9. The method of claim 8, wherein the bacteria is selected from the group consisting of *Corynebacterium ammoniagenes*, *Corynebacterium glutamicum*, *Escherichia coli*, *Bacillus megatherium*, *Serratia marcescens*, and *Brevibacterium ammoniagenes*.

10. The method of claim 8, wherein the amine group-containing cationic polymer is selected from the group consisting of polyethyleneimine, amine-terminated polyethylene oxide, amine-terminated polyethylene/polypropylene oxide, polymers of dimethyl amino ethyl methacrylate and copolymers of dimethyl amino ethyl methacrylate and vinyl pyrrolidone, linear polymers of epichlorohydrin and dimethyl amine, polydiallyldimethylammonium chloride, polyethanolamine/methyl chloride, and modified polyethyleneimine.

11. The method of claim 8, wherein the amine group-containing cationic polymer is a polyethyleneimine homopolymer and the biomass is a biomass of *Corynebacterium glutamicum*.

12. The method of claim 8, wherein the cross-linking agent is one or more selected from the group consisting of glutaraldehyde, isocyanide derivatives, and bisdiazobenzidine.

13. The method of claim 8, wherein the amine group-containing cationic polymer solution comprises one or more selected from the group consisting of water, methanol, ethanol, butanol, chloroform, and pyridine as a solvent.

14. The method of claim 8, wherein the cross-linking agent is mixed in the form of a solution at a volume ratio of about 10:1 to 1:1 with a mixed solution of the biomass and the amine group-containing cationic polymer.

15. The method of claim 8, wherein the cross-linking agent is mixed in the form of a solution at a volume ratio of 5:1 with a mixed solution of the biomass and the amine group-containing cationic polymer.

16. The method of claim 1, wherein the incineration is performed by burning the adsorption material on which the precious metal is adsorbed at less than the melting point of the precious metal.

17. The method of claim 1, wherein the incineration is performed by burning the adsorption material on which the precious metal is adsorbed at 600 to 1000° C.

18. The method of claim 1, wherein the separating comprises heating the precious metal comprised in the ash from the melting point of the precious metal to 3100° C. to melt the metal; and separating the precious metal in a liquid phase from the ash.

* * * * *